(12) United States Patent
Jacob

(10) Patent No.: US 10,380,220 B2
(45) Date of Patent: Aug. 13, 2019

(54) EMBEDDED SYSTEM, COMMUNICATION UNIT AND METHODS FOR IMPLEMENTING A FAST FOURIER TRANSFORM

(71) Applicant: NXP B.V., Eindhoven (NL)

(72) Inventor: Naveen Jacob, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/904,066

(22) Filed: Feb. 23, 2018

(65) Prior Publication Data

US 2018/0253399 A1 Sep. 6, 2018

(30) Foreign Application Priority Data

Mar. 3, 2017 (EP) ..................................... 17159166

(51) Int. Cl.
G06F 17/14 (2006.01)
G06F 17/16 (2006.01)
H04L 27/26 (2006.01)

(52) U.S. Cl.
CPC .......... *G06F 17/142* (2013.01); *G06F 17/141* (2013.01); *G06F 17/16* (2013.01);
(Continued)

(58) Field of Classification Search
CPC . H04L 27/263; H04L 27/265; H04L 27/2666; G06F 17/141; G06F 17/142; G06F 17/147; G06F 17/16
(Continued)

(56) References Cited

U.S. PATENT DOCUMENTS

| 6,609,140 B1 | 8/2003 | Greene |
| 7,499,509 B2 * | 3/2009 | Zhidkov ............. H04L 27/2647 375/134 |

(Continued)

OTHER PUBLICATIONS

Van de Burgwal, M. et al. "Non-Power-of-Two FFTs: Exploring the Flexibility of theMontium TP", 13 pg., retrieved from the Internet at: https://www.researchgate.net/publication/38107258_Non-Power-ofTwo_FFTs_Exploring_the_Flexibility_of_the_Montium_TP, (Dec. 4, 2008).

(Continued)

Primary Examiner — Young T Tse
(74) Attorney, Agent, or Firm — Rajeev Madnawat

(57) ABSTRACT

An embedded system is described. The embedded system includes a processing circuit comprising at least one processor configured to support an implementation of a non-power-of-2 fast Fourier transform of length N using a multiplication of at least two smaller FFTs of a respective first length N1 and second length N2, where N1 and N2 are whole numbers; and a memory, operably coupled to the processing circuit and comprising at least input data. The processing circuit is configured to: receive an input data complex number sequence; adapt the input data complex number sequence by inserting at least one zero into every $X^{th}$ data point that results in an excess number of data points above N, where X=N1, such that the inserted zeroes enables a use of a multiple-of-Q FFT; perform a first decomposed FFT of a respective first length N1 on the adapted input data complex number sequence and produce a first output complex number sequence; restore a number of data points of the first output complex number sequence to N after performing the first decomposed FFT; and perform a second decomposed FFT of a respective second length N2 on the first output complex number sequence that produces a second output complex number sequence.

13 Claims, 4 Drawing Sheets

(52) U.S. Cl.
CPC .......... *H04L 27/263* (2013.01); *H04L 27/265* (2013.01); *G06F 17/144* (2013.01)

(58) Field of Classification Search
USPC ........ 375/260–262, 265, 267; 370/208, 210; 455/400, 402–405
See application file for complete search history.

(56) References Cited

U.S. PATENT DOCUMENTS

| | | | | |
|---|---|---|---|---|
| 7,702,713 | B2* | 4/2010 | Goswami | H04L 27/265 708/404 |
| 2002/0025011 | A1* | 2/2002 | Sullivan | G01S 19/29 375/343 |
| 2007/0009061 | A1* | 1/2007 | Kaku | H04L 1/0071 375/295 |
| 2010/0149963 | A1* | 6/2010 | Bae | G06F 17/142 370/210 |
| 2010/0150217 | A1* | 6/2010 | Jwa | H04L 25/0204 375/224 |

OTHER PUBLICATIONS

Blake, A. "Computing the fast Fourier transform on SIMD microprocessors", 2 pgs., retrieved from the Internet on Sep. 21, 2017 at: https://cnx.org/exports/8364463c-d5e7-4617-b892-fc2b38f60a59%402.2.pdf/computing-the-fast-fourier-transform-on-simdmicroprocessors (Jul. 16, 2012).

Cypher, R. et al. "The SIMD Model of ParallelComputation", Springer Verlag, USA, 3 pgs. (Jan. 1, 1994).

Wyrzykowski, R. et al. "Parallel Processing and Applied Mathematics", Springer, Germany, 3, pgs. (Jan. 1, 2008).

Pingali. K. et al. "Languages and Compilers for parallel Computing", Springer, Germany, 4 pgs. (Jan. 1, 1995).

Sabot, G. "Optimized CM Fortran compiler for the Connection Machine computer", Proceedings of the Twenty-Fifth Hawaii International Conference on System Sciences, Kauai, HI, pp. 161-172, vol. 2 (1992).

* cited by examiner

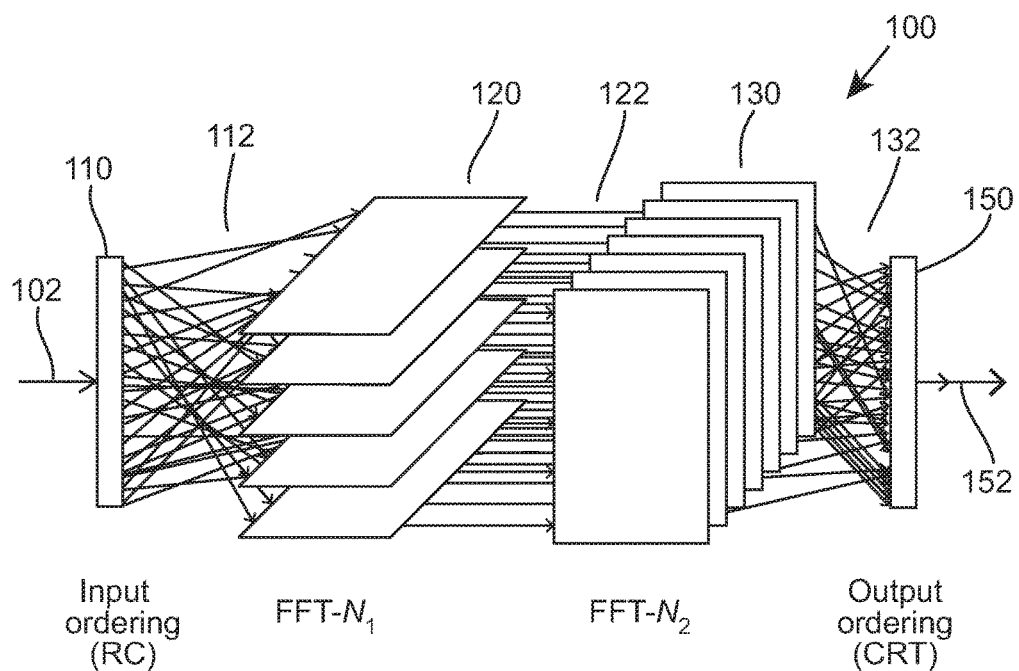
FIG. 1 - PRIOR ART
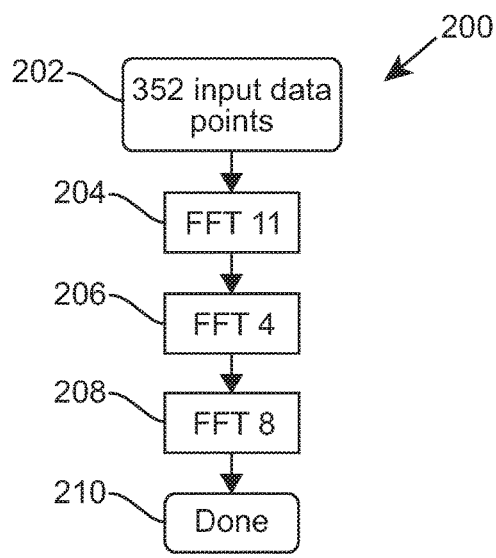
FIG. 2 - PRIOR ART

US 10,380,220 B2

EMBEDDED SYSTEM, COMMUNICATION UNIT AND METHODS FOR IMPLEMENTING A FAST FOURIER TRANSFORM

CROSS-REFERENCE TO RELATED APPLICATIONS

This application claims the priority under 35 U.S.C. § 119 of European Patent application no. 17159166.2, filed on Mar. 3, 2017, the contents of which are incorporated by reference herein.

FIELD OF THE INVENTION

The field of the invention relates to an embedded system, a communication unit, and methods for implementing Fast Fourier Transforms (FFTs). The invention is applicable to, but not limited to, a method for implementing an FFT or Inverse FFT with lengths that are not a power-of-2 and the FFT (when decomposed) does not yield a multiple-of-Q FFT.

BACKGROUND OF THE INVENTION

One of the challenges in implementing a Digital Radio Mondiale (DRM) application in a communication unit is the implementation of a Fast Fourier Transform (FFT) algorithm and/or an Inverse Fast Fourier Transform (IFFT) algorithm that are required in the baseband processing of an orthogonal frequency division multiplexed (OFDM) receiver. This is a challenging task as several of the supported FFT lengths are not a 'power-of-two', and the FFT when decomposed does not yield a multiple-of-2 FFT. Therefore, in these cases, a non-standard implementation approach to FFTs needs to be adopted. Table 1 below provides some examples of the FFT lengths that need to be supported with different DRM transmission modes.

TABLE 1

| DRM transmission mode | FFT length |
| --- | --- |
| A | 576 |
| B | 512 |
| C | 352 |
| D | 224 |
| E | 432 |

It is known that implementation of FFT lengths of the power-of-2 are easily realizable and typically exist in a form of libraries supplied by a vendor of a digital signal processor (DSP) that supports FFT and/or IFFT functionality. However, some of the DRM required FFT lengths in Table 1 are not of the power-of-2, and also not available as libraries. Therefore, an efficient realization of a FFT implementation on a DSP requires special techniques to exploit the best utilization of a given processor architecture.

The FFT is a faster implementation of a Discrete Fourier Transform (DFT), whose equation can be defined as a sequence of N complex numbers x0, x1, ... xN−1 that is of the form of [1]:

$$X_h \stackrel{def}{=} \sum_{n=0}^{N-1} x_n \cdot e^{-2\pi i k n/N}, k \in \mathbb{Z}(\text{integers}) \qquad [1]$$

The DFT computes frequency values (namely $X_k$) in a given input time domain sequence (namely $x_n$), and the term $e^{-2\pi i k n/N}$ used in the equation [1] is referred to as twiddle-factors. A twiddle factor, in FFT algorithms, is any of the trigonometric constant coefficients that are multiplied by the data in the course of the algorithm. It is known that the FFT efficiently implements the DFT, by exploiting symmetry in its twiddle factors.

A well-known FFT algorithm is the "divide and conquer" approach proposed by Cooley-Tukey in 'J. W. Cooley and J. W. Tukey, "An algorithm for the machine calculation of complex Fourier series," Mathematics of computation, vol. 19, pp. 297-301, April 1965'. This method is used for FFTs that have a length that is a power of the radix (e.g., two for radix-2). If other lengths are required, a mixed-radix algorithm can be used. For example an FFT-288 can be re-expressed with a radix-2 and radix-3 FFT (e.g. the 288-point FFT can be decomposed to FFT-32×FFT-9). A further more-efficient approach was introduced by Good in 'I. J. Good, "The Interaction Algorithm and Practical Fourier Analysis", Journal of the Royal Statistical Society. Series B (Methodological) Vol. 20, No. 2 (1958), pp. 361-372' in order to eliminate the intermediate multiplications required in the Cooley-Tukey approach. This algorithm is sometimes known as the Prime Factor Algorithm (PFA).

It is known that non-power-of-two FFTs can be generalized to a group of 2-dimensional PFA-decomposable DFTs of the form of equation [2]:

$$N = N_1 \cdot N_2 = (2p+1) \cdot 2^q. \qquad [2]$$

Table 2 provides an overview of a selection of the FFTs that can be generated with parameters 'p' and 'q' of the PFA equation [2], with those required for DRM depicted as underlined.

TABLE 2

| | q | | | |
| --- | --- | --- | --- | --- |
| p | 4 | 5 | 6 | 7 |
| 2 | 80 | 160 | 320 | 640 |
| 3 | 112 | 224 | 448 | 896 |
| 4 | 144 | 288 | 576 | 1152 |
| 5 | 176 | 352 | 704 | 1408 |
| 6 | 208 | 416 | 832 | 1664 |
| 7 | 240 | 480 | 960 | 1920 |

For DRM software to have a good performance in terms of the FFT computation time, memory, and power, an efficient non-power-of-two FFT implementation is required. Known reconfigurable co-processors have been developed to support non-power-of-two FFT realizations, as illustrated in FIG. 1 with the simplified arrangement 100 of a known PFA decomposed FFT. This FFT algorithm recursively re-expresses a DFT of length N=N1×N2, into smaller DFTs of size N1 120 and N2 130. The lengths of the small DFTs N1 120 and N2 130 have to be co-prime and can be implemented with an arbitrary algorithm. Good's mapping in equation [2] is used to convert N=N1×N2× ... × NL point DFT into a L-dimensional DFT equation and optimizes the PFA for the number of calculations to be performed. However, Good's mapping in equation [2] assumes that the input data 102 is ordered in Ruritanian Correspondence (RC) order by RC function 110, and output data in Chinese Remainder Theorem (CRT) order by CRT function 150, or vice versa. Thus, the simplified arrangement 100 routes 112 the respective ordered data bits to a first N-point DFT 120 of size N1 and thereafter a second N-point DFT 130 of size N2, before the output data is reordered by CRT function 150.

However, for many applications, such as an application that is required to support the five DRM transmission modes, use of a co-processor to solely implement a FFT function, and support non-power of 2 FFT computations and the FFT when decomposed that does not yield a multiple-of-2 FFT, adds an undesirable increase in cost of the solution.

Implementations of FFTs of length 576, 512, and 432 are available as libraries from the vendors of processors. However, the DRM FFT lengths of 352 and 224 are not available as third party libraries. Hence, a solution is needed to implement (at least for a DRM solution) the FFT 352 and FFT 224, for example optimized for a particular single instruction, multiple data (SIMD) vector processor. A vector processor, or array processor, is a central processing unit (CPU) that implements an instruction set containing instructions that operate on one-dimensional arrays of data called vectors. Here, each element of the vector feeds a single unique processing element, or the processing elements are lined up in a vector form to operate on the vector data. This arrangement is in contrast to a scalar processor, whose instructions operate on single data items.

Referring now to FIG. 2 a flowchart 200 illustrates a known operation for implementing a regular 352-point FFT using a PFA decomposed FFT on a DSP. Here, using a PFA decomposed FFT on a DSP, the FFT 352 can be decomposed into smaller FFTs, namely: FFT 11×FFT 4×FFT 8, where N1=11, N2=4, N3=8, and where the implementation of FFT4 and FFT8 is readily achievable. However, the FFT designer is required to devise techniques for deriving the best use of the processor or processing elements in order to implement the FFT11 operation. The flowchart 200 commences in step 202 with input data of 352 data points. At a first stage in 204, 32 instances of 11-point FFT are computed as [3]:

$$FFT11a(k)=FFT11(\times(32n+a)) \qquad [3]$$

Where:
 a is the instance number=0, 1, . . . , 31;
 n=0, 1, . . . , 10 to generate the 11 input values;
 k=0, 1, . . . , 10 to generate the 11 output values.

The output of FFT11 is processed by FFT4 in a second stage in 206, and, for a given FFT11, each of the 11 outputs goes to a different FFT4 module, as illustrated in FIG. 1. Thus, the second stage in 206 contains 88 instances of the 4-point FFT, which are computed as [4]:

$$FFT4b(l)=FFT4(FFT11a(b),FFT11a+8(b)*tw0(b),$$
$$FFT11a+16(b)*tw1(b),FFT11a+24(b)*tw2(b)) \qquad [4]$$

Where:
 b is the instance number=0, 1, . . . , 87;
 a is used on computation of the instance number of FFT11;
 a=0, 1, . . . , 7;
 l=0, 1, . . . , 3 generates the 4 output values; and
 tw0(b), tw1(b), and tw2(b) are twiddle factors for 'b' th instance of FFT4 in 206, as illustrated in [5], [6], [7].

$$FFT4b(l)=FFT4(FFT110(k),FFT118(k)tw0(b),$$
$$FFT1116(k)*tw1(b),FFT1124(k)*tw2(b)) \qquad [5]$$

for k=0, 1, . . . , 10; and for b=0, 1, . . . , 10

$$FFT4b(l)=FFT4(FFT111(k),FFT119(k)tw0(b),$$
$$FFT1117(k)*tw1(b),FFT1125(k)*tw2(b)) \qquad [6]$$

for k=0, 1, . . . , 10; and for b=11, 12, . . . , 21

$$FFT4b(l)=FFT4(FFT117(k),FFT115(k)tw0(b),$$
$$FFT1123(k)*tw1(b),FFT1131(k)*tw2(b)) \qquad [7]$$

for k=0, 1, . . . , 10; and for b=77, 78, . . . , 87

The flowchart 200 then comprises a third stage in 208 that consists of 44 instances of 8-point FFT that are computed as in [8]:

$$FFT8c(m)=FFT8(FFT4a(b),FFT4a+12(b)*tw0(c),$$
$$FFT4a+24(b)*tw1(c),FFT4a+36(b)*tw2(c),$$
$$FFT4a+48(b)*tw3(c),FFT4a+60(b)tw4(c),$$
$$FFT4a+72(b)*tw5(c),FFT4a+84(b)*tw6(c),) \qquad [8]$$

Where:
 c is the instance number=0, 1, . . . , 43;
 a is used on computation of the instance number of FFT4;
 b=0, 1, . . . , 3;
 m=0, 1, . . . , 7 to generate the 8 output values; and
 tw0(c), tw1(c), tw2(c), tw3(c), tw4(c), tw5(c) and tw6(c) are twiddle factors for 'c' th instance of FFT8.

The output of the third stage at 208, when re-arranged, generates the overall FFT output at 210. However, the inventor of the present invention has recognised and appreciated that such a known approach will not provide an optimal implementation, primarily because the fetching and processing of data will not be done in multiples of 'Y' data points, where Y represents an integer value greater than one, e.g. fetching and processing in multiples of '4 data points in the above FFT 352 scenario where the vector processor under consideration had 4 parallel multiplier units, which would significantly ease the complexity and speed of FFT processing.

Thus, an efficient DSP implementation is desired for an embedded system, and/or a communication unit, together with methods for implementing FFTs that support non-power of 2 FFT computations and where FFTs of a particular length are not available as libraries from the processor vendor.

SUMMARY OF THE INVENTION

The present invention provides an embedded system, a communication unit and FFT methods therefor, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 1 illustrates a simplified arrangement of a known PFA decomposed FFT.

FIG. 2 illustrates a flowchart of a known operation for implementing a regular 352-point FFT using a PFA decomposed FFT on a DSP.

DETAILED DESCRIPTION

Figure 3:
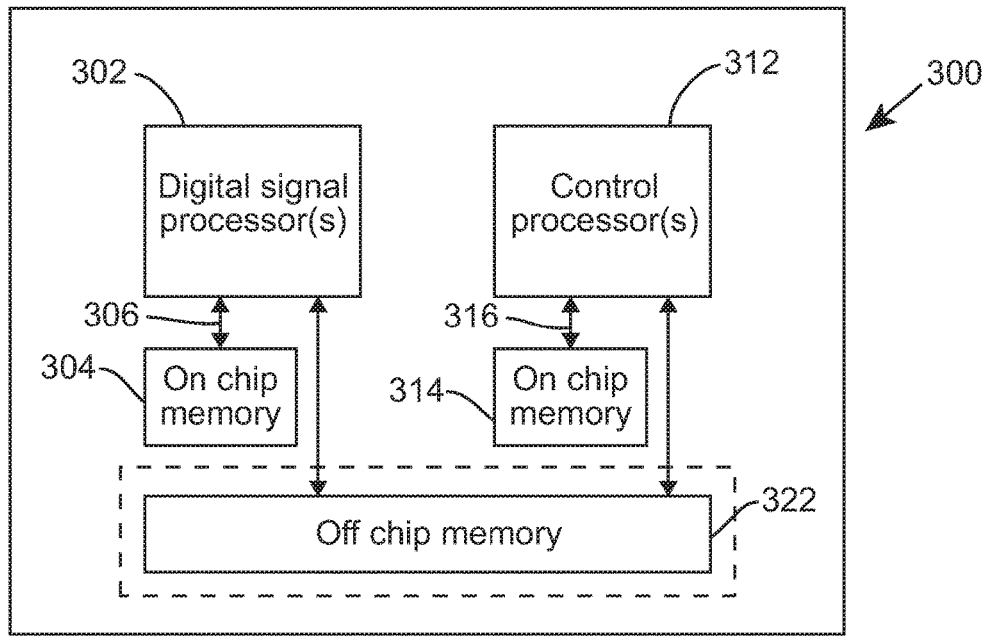
FIG. 3 illustrates an example of a block diagram of a communication unit, which in the illustrated example includes a software radio receiver and/or transmitter arrangement, according to example embodiments of the invention.

Although examples of the invention are described with reference to computation of a FFT, it is envisaged that in other examples, the circuits and concepts herein described may be equally applied to the computation of an inverse FFT (FFT) due to the similarity of the computations. Hence, it is envisaged that any reference to FFT hereafter encompasses an iFFT implementation.

Although examples of the invention are described with reference to a Digital Radio Mondiale (DRM) application in a communication unit, it is envisaged that, in other examples, the circuits and concepts herein described may be equally applied, in general, to any embedded systems. Furthermore, it is envisaged that examples of the invention are not limited to a software defined radio as described, but that the non-power-of-2 FFT lengths concepts may find equal applicability in any audio, video, radar, or other communication/entertainment systems. Examples of the invention are also described with reference to a method for implementing an FFT or Inverse FFT with lengths that are not a power-of-2 and the FFT (when decomposed) does not yield a multiple-of-Q FFT.

In a generalized case, examples of the invention are also described with reference to adding an excess of 'P' zeroes (where P>=1) that enables the usage of a multiple-of-Q FFT, where 'Q' is a number of processing units that can operate in parallel; or the processor has the support for performing FFT-of-length-Q in a single cycle.

Examples of the invention are described with reference to a non-power-of-two FFT implementation in a single instruction, multiple data (SIMD) vector processor, which is a class of parallel computers with multiple processing elements that perform the same operation on multiple data points simultaneously. However, it is envisaged that in other examples, the circuits and concepts herein described may be equally applied to other processors that operate with multiple processing elements. Examples of the invention provide solutions for a non-power-of-two FFT implementation using less processing time and/or require less processing power.

Examples of a first aspect of the present invention provide a method of performing a FFT operation, an embedded system and a communication unit that include: a processing circuit comprising at least one processor configured to support an implementation of a non-power-of-2 fast Fourier transform (FFT) of length N using a multiplication of at least two smaller FFTs of a respective first length N1 and second length N2, where N1 and N2 are whole numbers; and a memory, operably coupled to the processing circuit and comprising at least input data. The processing circuit is configured to: receive an input data complex number sequence; adapt the input data complex number sequence by inserting at least one zero into every $X^{th}$ data point that results in an excess number (M) of data points above N, where X=N1, such that the inserted zeroes enables a use of a multiple-of-Q FFT; perform a first decomposed FFT of a respective first length N1 on the adapted input data complex number sequence and produce a first output complex number sequence; restore a number of data points of the first output complex number sequence to N after performing the first decomposed FFT; and perform a second decomposed FFT of a respective second length N2 on the first output complex number sequence that produces a second output complex number sequence.

In this manner, an embedded system, and/or a communication unit and method are described whereby a FFT architecture is able to support non-power-of-2 FFT computations and where decomposed FFTs are of a non-multiple-of-2 length and the particular length is not available as libraries from the processor vendor. In some examples, this is achieved through insertion of zeroes into the input data complex number sequence and thereafter using a less complex or less processor-heavy decomposed FFT processor.

In some examples, one of the at least two smaller FFTs of a respective first length N1 and second length N2 is the multiple-of-Q FFT, where Q is a number of processing elements that are operated in parallel. In some examples, Q is one from a group of: two, such that a multiple-of-2 FFT operates using two processing elements in parallel; three, such that a multiple-of-3 FFT operates using three processing elements in parallel; four, such that a multiple-of-4 FFT operates using four processing elements in parallel. Alternatively, in some examples, one of the at least two smaller FFTs of a respective first length N1 and second length N2 is the multiple-of-Q FFT, and wherein the processor circuit is configured to perform an FFT-of-length-Q in a single cycle.

In this manner, the fetching and processing of data may be performed in multiples of 'Y' data points, e.g. multiples of '4 data points that is less complex by being consistent across the whole FFT. Also, only one of the decomposed FFTs needs to be configured to insert '0's into the complex number sequence.

In some examples, the processing circuit being configured to perform a second decomposed FFT of a respective second length N2 on the first output complex number sequence comprises the processing circuit being configured to: insert a zero into every $X^{th}$ data point that results in an excess number (M) of data points above N, where X=N2, such that the inserted zeroes enables a use of a multiple-of-Q FFT; perform a second decomposed FFT of a respective second length N2 on the adapted input data complex number sequence and produce a second output complex number sequence; and restore a number of data points of the second output complex number sequence to N after performing the second decomposed FFT.

In some examples, the processing circuit may be configured to use customized data indexing for subsequent FFT computations, wherein the customized data indexing for computations performed by the second decomposed FFT or subsequent FFT, wherein the customized data indexing is configured to avoid processing an additional redundant data line incorporating inserted zero data points inserted every $X^{th}$ data point. In some examples, the processing circuit may be configured to restore the complex number sequence to 'N' points and thereby remove an additional redundant data line incorporating inserted zero data points inserted every $X^{th}$ data point.

In some examples, the memory may store other associated data in a form of at least one from a group of: one or more twiddle factors, a table of customized data indexing. In some examples, the customized data indexing may be configured to target only valid data, thereby ignoring any results from input zeroes.

In some examples, the processing circuit may be configured to perform a 352 data point FFT by expanding the input data through inserting every $X^{th}$ data point as a zero to a 384 data point FFT. In some examples, the processing circuit may be configured to decompose a FFT operation into three smaller FFTs, using a further multiplication of a third length N3, where a first smaller FFT performs a 12-data point FFT (N1=12), a second smaller FFT performs a 4-data point FFT (N2=4) and a third smaller FFT performs a 8-data point FFT (N3=8) In this manner, a DRM FFT can be efficiently supported using multiple-of-4 FFTs, rather than using a non-multiple of 4 FFT (i.e. on an FFT11) with a FFT4 and an FFT8 following (in this example).

Thus, in some examples and to further illustrate the concepts herein described (to implement, for example, a 352 point FFT), the 352 point FFT is decomposed into three smaller FFTs, namely 352=N1 (as 11)×N2 (as 8)×N3 (as 4). Instead, examples of the invention propose employing a 384 point FFT=N1 (as 12)×N2 (as 8)×N3 (as 4). However, the 352 point FFT is realized later in the process, for example by means of using a 'twiddle' table of 11 point FFT, say, in a first stage and having every $12^{th}$ data point inserted as an additional 'zero' to increase the data points from 352 to 384. In some examples, a rearrangement of the data may be employed after the first FFT stage (e.g. corresponding to N1), for this table look up based rearrangement. Alternatively, in other examples, the rearrangement of data may be initiated before N2 and/or N3 (and/or so on . . . ) stages is also contemplated. Examples of the invention, use N1 as a multiple of '4', in order to realize an efficient FFT implementation for a SIMD processor having '4' parallel processing units.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

A second aspect of the invention includes a communication unit having a processing circuit according to the first aspect.

A third aspect of the invention describes a method for an embedded system to support an implementation of a non-power-of-2 fast Fourier transform (FFT) of length N. The method includes: receiving input data of a complex number sequence; adapting the input data complex number sequence by inserting at least one zero into every $X^{th}$ data point that results in an excess number (M) of data points above N, where X=N1, such that the inserted zeroes enables a use of a multiple-of-Q FFT; performing a first decomposed FFT of a respective first length N1 on the adapted input data complex number sequence using the multiple-of-Q FFT and produce a first output complex number sequence; restoring a number of data points of the first output complex number sequence to N after performing the first decomposed FFT; and performing a second decomposed FFT of a respective second length N2 on the first output complex number sequence that produces a second output complex number sequence.

Referring first to FIG. 3, a simplified example of a block diagram of a communication unit 300 is illustrated, which includes a software communication receiver and/or transmitter arrangement, according to example embodiments of the invention. The example communication unit 300 includes a Digital Signal Processor (DSP) circuit 302 coupled via bus 306 to on-chip memory 304. The example communication unit 300 also includes one or more Control Processor circuit(s) 312 coupled via bus 316 to further on-chip memory 314. In some examples, off-chip memory 322 may also be connected to the DSP circuit 302 and/or the one or more Control Processor circuit(s) 312.

In this example, the DSP circuit 302 may include one or more DSPs and be configured to contain the software and specialized functional units (hardware) to realize a FFT algorithm. However, in other examples, the DSP circuit 302 may be replaced by the, or a further, control processor 312 that is configured to implement the FFT algorithm for example in accordance with FIG. 5 or FIG. 6 or FIG. 7. For an efficient realization of the FFT algorithm, and in this example, the input data and other associated data (for example twiddle factors and/or a table of customized data indexing) may be loaded in the on-chip memory 304, 314 to provide the fastest access by the respective processor 302, 312.

A skilled artisan will appreciate that the level of integration of receiver circuits or components may be, in some instances, implementation-dependent. Furthermore, a signal processor in the transmit chain of communication unit 300 may be implemented as distinct from a signal processor in the receive chain. Alternatively, a single processor, such as DSP 302 in FIG. 3, may be used to implement a processing of both transmit and receive signals. Clearly, the various components within the communication unit 100 can be realized in discrete or integrated component form, with an ultimate structure therefore being an application-specific or design selection and that other components, circuits and functions of a typical communication unit (such as radio frequency amplification, generation, filtering, etc. components and circuits) are not shown for clarity purposes only.

Figure 4:
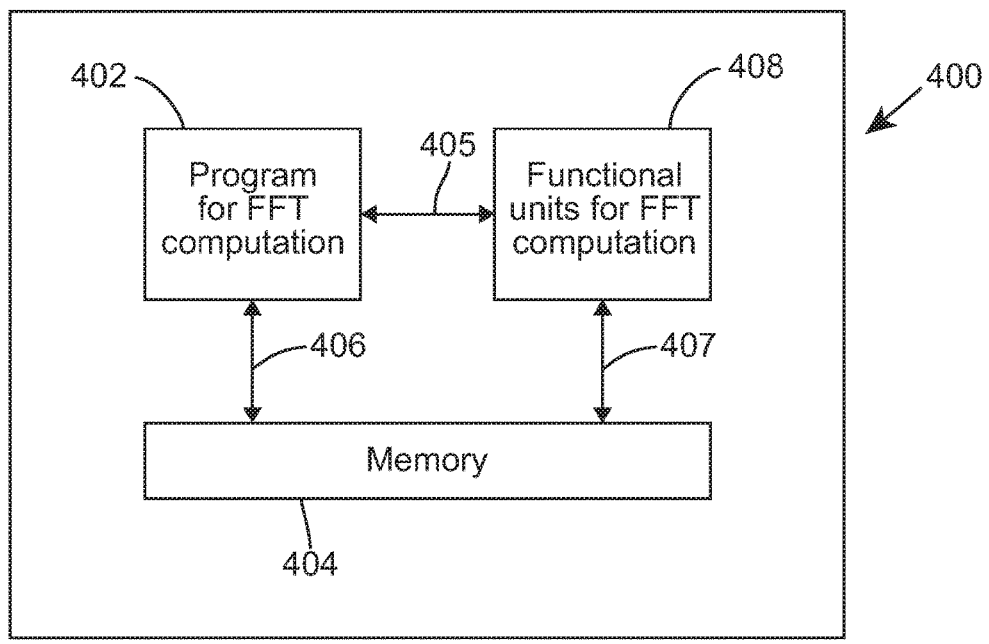
FIG. 4 illustrates an example of a block diagram of an embedded system that includes a processor and is configured to support an implementation of a non-power-of-2 FFT, according to example embodiments of the invention.

FIG. 4 illustrates an example of a block diagram of an embedded system that includes a processor 400 and is configured to support an implementation of a non-power-of-2 FFT, and the FFT when decomposed does not yield a multiple-of-Q (such as a multiple-of-2) FFT, according to example embodiments of the invention. In some examples, the processor in the embedded system may be implemented in a communication unit, and be configured to support an implementation of a non-power-of-2 FFT using the DSP circuit 302 or one or more Control Processor circuit(s) 312 of FIG. 3, according to example embodiments of the invention. In processor 400, an example software program 402 is configured to realize the FFT computation of a given length for the data fetched from the memory 404, such as on-chip memory 304, 314 of FIG. 3 via respective buses 406, 407. In some examples, the example software program 402 may be a general software program that can be run on a processor 400 or an optimized routine written in the language/Instruction(s) specific to the digital signal processor. In some examples, the example software program 402 may be implemented in firmware. In examples of the invention, the example software program 402 is configured to provide an efficient implementation of FFT for lengths that are not directly related to an order of a power-of-2 (where power-of-2 means FFTs of length 4, 8, 16, 32, 64, 128, 256, 512, 1024, etc.).

The FFT implementation for a length of non-power-of-2 by making use of the hardware/functional units 408 of the power-of-2 FFT is disclosed herewith. In software defined radio for example here DRM standard (Digital Radio Mondiale), by the system design it is required to perform FFTs that are of length 352, 224, 576, etc., which are not power-of-2.

In a first aspect of the invention, the efficient FFT implementation is possible by means of power-of-2 FFTs (in this case FFT of length '4' is taken for FFT of length 352) by having additional data points set as zero. In some examples of the first aspect, this is achieved by modifying the FFT equations to avoid processing the extra data lines corresponding to the inserted zero data points. In a software realization, this amounts to picking up the correct data for processing, referred to as 'data Indexing'. In some examples of the first aspect, a software implementation may be employed to make use of the functional units for FFT computation (e.g. hardware support for FFT of length '4') where again the additional data points are set as zero. In this context, the term functional unit encompasses any computation unit that realizes a function, such as multiplication or FFT etc. For example, in one case, the parallel multipliers that are present (say, a set of 4 complex multipliers) may be considered as a functional unit. In another case, the multipliers together with the necessary hardware unit to perform FFT of length '4' may also be considered as a functional unit.

In this example of a first aspect of the invention, let us assume that a 352-point FFT is to be implemented as an 11 point FFT×4 point FFT×8 point FFT. The traditional way to implement an 11 point FFT is to use the equation of an 11-point FFT, as indicated in FIG. 2. However, such an approach will not provide an optimal implementation, primarily because the fetching and processing of data will not be done in multiples of '4' data points. Therefore, in accordance with one example of the first aspect of the invention, instead of using a traditional 11 point FFT, the FFT is rewritten as a 12 point FFT. In one example, the FFT may be rewritten as a 12 point FFT by using the twiddle factors of an 11-point FFT with the last twiddle factor set as a zero, which results in a multiple of '4' FFT and an efficient implementation on a vector DSP. Thus, the 11-point FFT is implemented in lines of a 12-point FFT, where the twiddle factors used in the DFT equation are those of 11-point FFT and the last data point's twiddle factor is always zero.

Thus, in a generalized case, an excess of 'P' zeroes (where P>=1) is added, which enables the usage of a multiple-of-Q FFT, where 'Q' is a number of processing units that can operate in parallel; or whereby the processor circuit has the support for performing FFT-of-length-Q in a single cycle.

Alternatively, in some further examples of the first aspect of the invention, instead of having an explicit twiddle factor of zero, it may be more efficient to have the last data point itself set as a zero. In this example, it doesn't matter which twiddle factor is multiplied with this data point, as the result is zero. This way the first aspect solution is to increase the input buffer to be of size 12×4×8=384 data points. In this example, after the 12-point FFT, the redundant data points (i.e. 32 data points in this example) may be removed. Thereafter, the other decomposed portions of the FFT may be processed in the traditional SIMD way, e.g. followed by a 4-point FFT and an 8-point FFT. However, it is noted that this will have a processor cycles overhead, which is the time spent in copying data after performing an 11-point FFT.

Although examples of the invention have been described with reference to performing a 352-data point FFT, the concepts herein described are equally applicable to any non-power-of-2 FFT.

Although examples of the invention have been described with reference to performing a 352-data point FFT in the order of a 11-point FFT followed by a 4-point FFT and followed by an 8-point FFT, it is envisaged that any order of decomposed FFTs may be used, e.g. 4-8-11, 8-11-4, 11-4-8, 8-4-11, 4-11-8, or 11-8-4. However, from a point of view of implementation accuracy, an ascending order is desirable—i.e. 4-point FFT followed by a 8-point FFT followed by a 11-point FFT.

As will be appreciated by a skilled artisan, this example approach of the first aspect of the invention is a significant improvement over the known traditional technique of using a non-multiple of '4' FFT, but may be considered as not fully efficient because useful data memory is lost by necessitating a part of it to be filled with zeroes.

This $12^{th}$ data point is used for the first (non-power-of-4) FFT stage (11-point FFT). In this manner, the second aspect of the invention may avoid processing the 'dummy' line by fetching up data from solely the indexed lines that would contain valid data.

Figure 5:
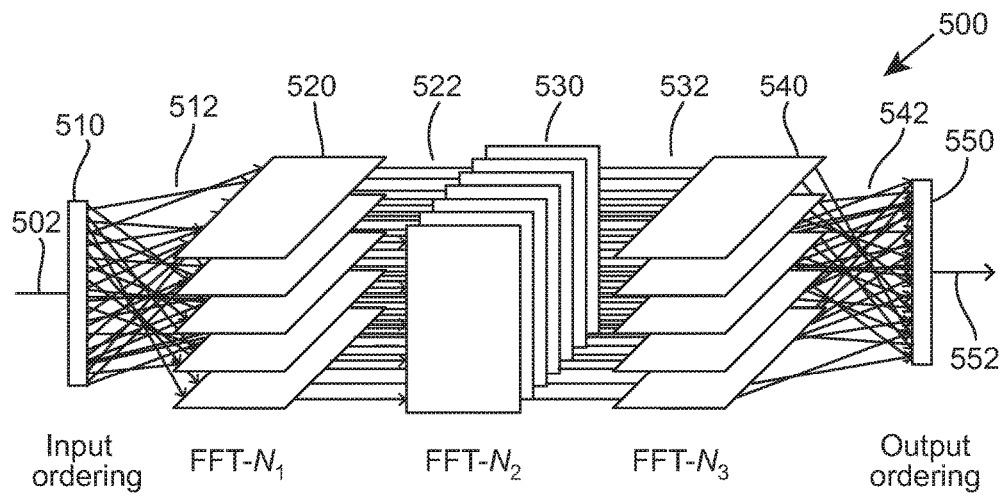
FIG. 5 illustrates an example of an operation for implementing a 352-point FFT using a PFA decomposed FFT on a DSP, according to example embodiments of the invention.

Referring now to FIG. 5, an example of an operation for implementing a 352-point FFT, using a PFA decomposed FFT on a DSP is illustrated according to example embodiments of the invention. Although, for the example 352-point FFT, three decomposed FFTs are used, the concepts herein described will equally apply to two or four or more decomposed FFTs, for use with other length FFTs. This example of a 352-point FFT algorithm recursively re-expresses a DFT of length N=N1×N2×N3, into smaller DFTs of size N1 520 and N2 530 and N3 540. The lengths of the small DFTs N1 520 and N2 530 and N3 530 have to be co-prime and can be implemented with an arbitrary algorithm. Here, two integers are said to be coprime if the only integer that divides them commonly is '1'. Also, in this context, the term 'arbitrary' encompasses any method to implement the FFT for non-power-of-two lengths. Good's mapping in [2] is used to convert N=N1×N2× . . . × NL point DFT into a L-dimensional DFT equation and optimizes the PFA for the number of calculations to be performed. However, Good's mapping in [2] assumes that the input data 502 is ordered in Ruritanian Correspondence (RC) order by RC algorithm 510, and output data in Chinese Remainder Theorem (CRT) order by CRT algorithm 550, or vice versa.

In examples of the invention, the input data is reconfigured a part of 510 by inserting zeroes in every $12^{th}$ data point, as previously described. The 352-point FFT 500 then equates to a 384 data point FFT, and the respectively ordered and expanded input data bits are routed 512 to a first 12-point DFT 520. In this first example of the invention, the DSP performs a first 12-point DFT 520 and then removes the redundant or dummy zeroes. In this manner, the DSP reverts the FFT back to a 352-point FFT. Thereafter, the DSP takes the output 522 from the first 12-point DFT 520 and performs a second (decomposed) 4-point DFT 530. Thereafter, the DSP takes the output 532 from the second (decomposed) 4-point DFT 530 and performs a third (decomposed) 8-point DFT 540. Finally, the DSP takes the output 542 from the third (decomposed) 8-point DFT 540 and re-orders the output data using a CRT function or algorithm 550, before the re-ordered FFT data is output 552.

Figure 6:
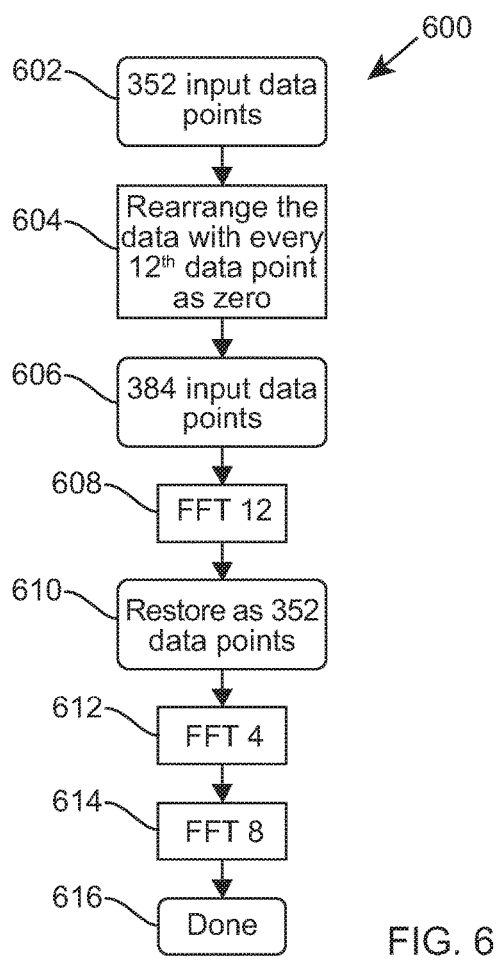
FIG. 6 illustrates a first example flowchart of an operation for implementing a 352-point FFT using a PFA decomposed FFT on a DSP, according to example embodiments of the invention.

Referring now to FIG. 6, a first example flowchart of an operation for implementing a 352-point FFT using a PFA decomposed FFT on a DSP, is illustrated according to example embodiments of the invention. Here, using a PFA decomposed FFT on a DSP, the FFT 352 is expanded to a FFT 384 with '0' data bits inserted at a regular position in the input data sequence, which is every $12^{th}$ data point in this example, and then decomposed into smaller FFTs, namely: FFT 12×FFT 4×FFT 8. In accordance with example embodiments, the processor or processing elements have been adapted in order to implement a FFT 12 operation, rather than a FFT11 operation. The flowchart 600 commences in step 602 with an input data of 352 points. Initially, the 352 input data points are re-arranged at 604 with a '0' inserted into every 12$^{th}$ data point, resulting in, at 606, 384 data points. With 384 data points, and at a first stage in 608, 32 instances of 12-point FFT are computed. At 610, the data bits are then restored to an original 352 data points, after performing the first decomposed FFT. At a second stage in 612, 88 instances of 4-point FFT are computed. At a third stage in 614, 44 instances of 8-point FFT that are also computed. The output of the third stage at 614, when re-arranged, generates the overall FFT output at 616.

Figure 7:
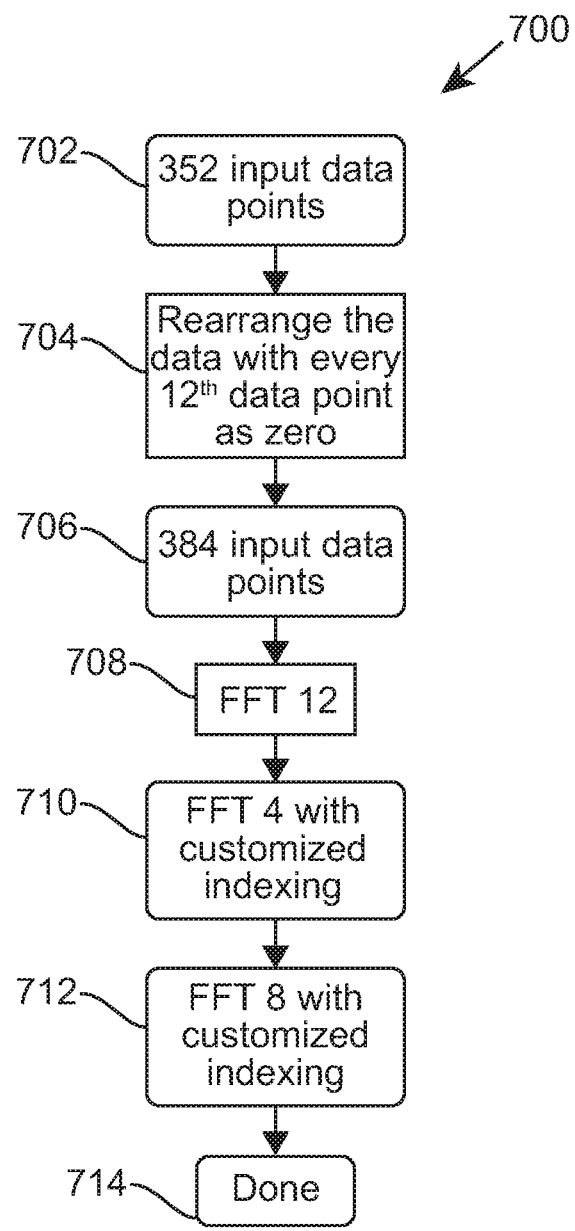
FIG. 7 illustrates a second example flowchart of an operation for implementing a 352-point FFT using a PFA decomposed FFT on a DSP, according to example embodiments of the invention.

Referring now to FIG. 7, a second example flowchart 700 of an operation for implementing a 352-point FFT using a PFA decomposed FFT on a DSP, is illustrated according to example embodiments of the invention. Here, using a PFA decomposed FFT on a DSP, the FFT 352 is expanded to a FFT 384 with '0' data bits inserted at a regular position in the input data sequence, which is every 12$^{th}$ data point in this example, and then decomposed into smaller FFTs, namely: FFT 12×FFT 4×FFT 8. In accordance with example embodiments, the processor or processing elements have been adapted in order to implement a FFT 12 operation, rather than a FFT 11 operation. The flowchart 700 commences in step 702 with input data of 352 points. Initially, the 352 input data points are re-arranged at 704 with a '0' inserted into every 12$^{th}$ data point, resulting in, at 706, 384 data points. With 384 data points, and at a first stage in 708, 32 instances of 12-point FFT are computed. At a second stage in 710, 96 instances of 4-point FFT are computed with customised indexing, as described above. In this context, in some examples, memory, such as memory 404 in FIG. 4, may be configured to store other associated data, in addition to at least input data. In this example, the other associated data may include twiddle factors and/or the customised indexing. The customized indexing targets only valid data, thereby ignoring any of the results from the input zeroes. At a third stage in 712, 56 instances of 8-point FFT are also computed. The output of the third stage at 712, when re-arranged, generates the overall FFT output at 714.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above. The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed to additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the circuit and/or component examples may be implemented as any number of separate integrated circuits or separate devices interconnected with each other in a suitable manner. Also for example, the examples, or portions thereof, may implemented as soft or code representations of physical circuitry or of logical representations convertible into physical circuitry, such as in a hardware description language of any appropriate type. Also, the invention is not limited to physical devices or units implemented in non-programmable hardware but can also be applied in programmable devices or units able to perform the desired sampling error and compensation by operating in accordance with suitable program code, such as minicomputers, personal computers, notepads, personal digital assistants, electronic games, automotive and other embedded systems, cell phones and various other wireless devices, commonly denoted in this application as 'embedded systems'. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An embedded system comprising:
   a processing circuit comprising at least one processor configured to support an implementation of a non-power-of-2 fast Fourier transform (FFT) of length N using a multiplication of at least two smaller FFTs of a respective first length N1 and second length N2, where N, N1, and N2 are whole numbers; and
   a memory, operably coupled to the processing circuit and comprising at least input data, the input data including an input data complex number sequence;
   wherein the processing circuit is configured to:
   receive the input data complex number sequence from the memory;
   adapt the received input data complex number sequence by inserting at least one zero into every $X^{th}$ data point that results in an excess number of data points above the length N, where X is a whole number and X=N1, such that the inserted zeroes enables a use of a multiple-of-Q FFT, wherein Q is a number of processing elements that are operated in parallel;
   perform a first decomposed FFT of the respective first length N1 on the adapted input data complex number sequence using the multiple-of-Q FFT to produce a first output complex number sequence;
   restore a number of data points of the first output complex number sequence to the length N after performing the first decomposed FFT; and
   perform a second decomposed FFT of the respective second length N2 on the first output complex number sequence to produce a second output complex number sequence.

2. The embedded system of claim 1, wherein one of the at least two smaller FFTs of the respective first length N1 and second length N2 is the multiple-of-Q FFT.

3. The embedded system of claim 2, wherein Q is one from a group of: two, such that a multiple-of-2 FFT operates using two processing elements in parallel; three, such that a multiple-of-3 FFT operates using three processing elements in parallel; four, such that a multiple-of-4 FFT operates using four processing elements in parallel.

4. The embedded system of claim 1, wherein one of the at least two smaller FFTs of the respective first length N1 and second length N2 is the multiple-of-Q FFT, and wherein the processor circuit is configured to perform an FFT-of-length-Q in a single cycle.

5. The embedded system of claim 1, wherein the processing circuit is further configured to use customized data indexing for computations performed by the second decomposed FFT or subsequent FFT, wherein the customized data indexing is configured to avoid processing an additional redundant data line incorporating inserted zero data points inserted every $X^{th}$ data point.

6. The embedded system of claim 1, wherein the processing circuit is configured to perform a 352 data point FFT by expanding the input data complex number sequence by inserting a zero into every $12^{th}$ data point as to a 384 data point FFT.

7. The embedded system of claim 6, wherein the processing circuit is configured to decompose a FFT operation into three smaller FFTs, using a further multiplication of a third length N3, where a first smaller FFT performs a 12-data point FFT, a second smaller FFT performs a 4-data point FFT and a third smaller FFT performs a 8-data point FFT.

8. The embedded system of claim 1, wherein the memory further comprises other associated data in a form of at least one from a group of: one or more twiddle factors, a table of customized data indexing.

9. The embedded system of claim 8, wherein the customized data indexing is configured to target only valid data, thereby ignoring any results from input zeroes.

10. The embedded system of claim 1, wherein the at least one processor is a single instruction, multiple data (SIMD) vector processor.

11. A communication unit, comprising:
    a processing circuit comprising at least one processor configured to support an implementation of a non-power-of-2 fast Fourier transform (FFT) of length N using a multiplication of at least two smaller FFTs of a respective first length N1 and second length N2, where N, N1, and N2 are whole numbers; and
    a memory, operably coupled to the processing circuit and comprising at least input data and other associated data, the input data including an input data complex number sequence;
    wherein the processing circuit is configured to:
    receive the input data complex number sequence from the memory;
    adapt the received input data complex number sequence by inserting at least one zero into every $X^{th}$ data point that results in an excess number of data points above the length N, where X is a whole number and X=N1, such that the inserted zeroes enables a use of a multiple-of-Q FFT, wherein Q is a number of processing elements that are operated in parallel;
    perform a first decomposed FFT of the respective first length N1 on the adapted input data complex number sequence using the multiple-of-Q FFT to produce a first output complex number sequence;
    restore a number of data points of the first output complex number sequence to the length N after performing the first decomposed FFT; and
    perform a second decomposed FFT of the respective second length N2 on the first output complex number sequence to produce a second output complex number sequence.

12. A method for an embedded system to support an implementation of a non-power-of-2 fast Fourier transform (FFT) of length N, the method comprising:
    receiving an input data complex number sequence;
    adapting the received input data complex number sequence by inserting at least one zero into every $X^{th}$ data point that results in an excess number of data points above the length N, where N is a whole number and X=N1, such that the inserted zeroes enables a use of a multiple-of-Q FFT;
    performing a first decomposed FFT of a respective first length N1 on the adapted input data complex number sequence using the multiple-of-Q FFT to produce a first output complex number sequence;
    restoring a number of data points of the first output complex number sequence to the length N after performing the first decomposed FFT; and
    performing a second decomposed FFT of a respective second length N2 on the first output complex number sequence to produce a second output complex number sequence;
    where N, N1, and N2 are whole numbers and Q is a number of processing elements that are operated in parallel.

13. The method of claim 12, wherein restoring the number of data points of the first output complex number sequence to the length N after performing the first decomposed FFT comprises using customized data indexing for computations performed by the second decomposed FFT or subsequent FFT, wherein the customized data indexing is configured to avoid processing an additional redundant data line incorporating the zero data points inserted every $X^{th}$ data point.

* * * * *